United States Patent Office 3,275,640
Patented Sept. 27, 1966

3,275,640
SUBSTITUTED 1-HYDROCARBYL-4-(10-THIAXANTHYLIDENE) PIPERIDINES
Edward L. Engelhardt, Gwynedd Valley, and Howard C. Zell, Ambler, Pa., assignors to Merck & Co., Inc., Rahway, N.J., a corporation of New Jersey
No Drawing. Filed Sept. 29, 1961, Ser. No. 141,607
6 Claims. (Cl. 260—293.4)

This invention relates to new chemical compounds and to a novel method for preparing them. In particular the invention relates to new thiaxanthene derivatives having the following general formula:

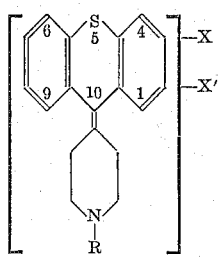

and non-toxic acid addition salts thereof, wherein X and X' respectively represents hydrogen, halogen, particularly fluorine, chlorine or bromine, a lower alkyl radical, for example, a straight or branched chain alkyl radical having from 1 to about 4 carbon atoms, a perfluoroalkyl radical having from 1 to 4 carbon atoms, and a lower alkoxy radical preferably having a straight or branched alkyl chain with from 1 to about 4 carbon atoms; and R is a lower alkyl or a lower alkenyl radical having up to four carbon atoms.

The compounds of this invention have been found to be valuable therapeutic agents particularly because of their antihistaminic, and/or antiserotonin properties. For medicinal purposes, these substances are conveniently administered as salts, the identity of the acid being of little importance provided it is non-toxic. The salts are therefore considered to be equivalent to the bases. The compounds can be administered orally in capsules or in tablets or in other oral dosage forms in an amount of from about 1 to about 250 mg. per dose to be administered from 2 to 4 times a day, or they can be administered in the form of sterile solutions containing from about 0.1 to about 50 mg. of active ingredient per dose to be administered from 2 to 4 times a day.

The novel process which has been developed to make the compounds of this invention constitutes another feature of this invention. This reaction can be schematically illustrated as follows:

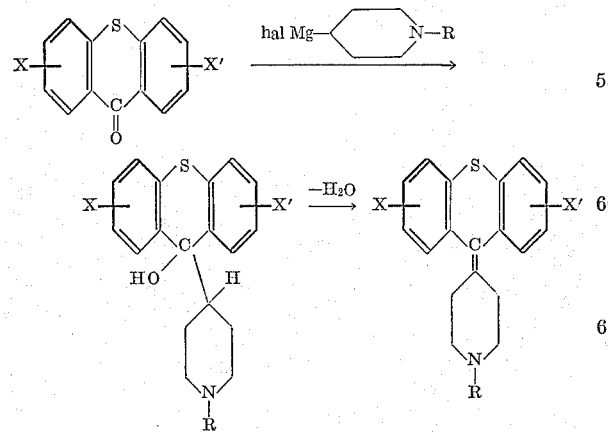

According to this process the Grignard reagent is prepared from the appropriate 1-lower alkyl-4-halo-piperidine in tetrahydrofuran. The holgen, represented by hal, is preferably chlorine or bromine. The desired thiaxanthone derivative then is added to the reaction mixture. These thiaxanthones, substituted with X and/or X' are known in the art, or they can be made by substantially the same methods described in the literature for preparing the known thiaxanthones. After hydrolysis of the Grignard adduct, the 1-alkyl-4-(10-hydroxy-10-thiaxanthyl)-piperidine is isolated and dehydrated to the desired 1-alkyl-4-(10-thiaxanthylidene)-piperidine which can be isolated as an acid addition salt.

The dehydration constitutes a particular feature of this invention as it has been found that formic acid is unique in bringing this about.

For therapeutic purposes, the products of this invention are conveniently administered as salts, the identity of the acid, either mineral or organic, being of little importance provided it is non-toxic. The salts are, therefore, considered to be equivalent to the bases.

The new compounds and the improved process for making them will be described in more detail in the following illustrative examples.

EXAMPLE 1.—1-METHYL-4-(10-THIAXANTHYLI-DENE)-PIPERIDINE

*Step A.—Preparation of 1-methyl-4-piperidylmagnesium chloride*

Magnesium turnings (3.65 g., 0.150 g. atom) are placed in a 1 liter, 4-necked flask provided with two 500 ml. dropping funnels, condenser and stirrer. An atmosphere of dry nitrogen is maintained in the apparatus throughout the reaction. One ml. of an ethyl ether solution of ethyl magnesium bromide is added as initiator and then a solution of 20.1 g. (0.150 mole) of 1-methyl-4-chloropiperidine in 250 ml. of dry, peroxide-free tetrahydrofuran is added dropwise from one of the dropping funnels at a rate which maintains gentle reflux. When the addition is complete, the reaction mixture is heated under reflux for an additional two hours.

*Step B.—Preparation of 1-methyl-4-(10-hydroxy-10-thiaxanthyl)-piperidine*

The reaction mixture of Step A then is cooled to 5°–10° C. and stirred at this temperature while a slurry of 23.5 g. (0.111 mole) of thiaxanthone in 300 ml. of tetrahydrofuran is added over one hour from the second dropping funnel. After stirring for two hours, during which the reaction mixture is allowed to warm up to room temperature, it is returned to 10° C. and 15 ml. of water added slowly with vigorous stirring. The reaction mixture is allowed to remain at room temperature overnight.

The tetrahydrofuran solvent is removed under vacuum at 50° C. and the resulting solid extracted continuously with chloroform in a Soxhlet apparatus for 8 hrs. Removal of the chloroform solvent under vacuum yields 37.4 g. of white solid which is purified by conversion to the hydrogen maleate salt with maleic acid. Recrystallization of the maleate from a chloroform-ethyl ether solvent mixture yields 19.8 g. (41.7%) of maleate salt with a M.P. of 196.1°–198.6° C. (dec.). The free base is obtained by stirring the maleate with 300 ml. of a 10% sodium hydroxide solution at 5° C. for 10 minutes, filtering and drying the resulting solid at 75° C. Recrystallization from a chloroformhexane solvent mixture gives 12.7 g. (36.7%) of a light tan solid, M.P. 188.6°–191.1° C. Further recrystallization gives an analytical sample, M.P. 192.6°–193.4° C.

$\lambda_{maximum}^{Methanol}$ 214 m$\mu$, $\epsilon$ 24,690;

267 m$\mu$, $\epsilon$ 11,536; shoulder at 251–4 m$\mu$; minimum at 238–40 m$\mu$.

*Analysis.*—Calculated for $C_{19}H_{21}NOS$: C, 73.26; H, 6.80. Found: C, 73.19; H, 7.10.

*Step C.—Preparation of 1-methyl-4-(10-thiaxanthylidene)-piperidine*

A solution of 12.15 g. (0.0391 mole) of 1-methyl-4-(10-hydroxy-10-thiaxanthyl)-piperidine and 150 ml. of 98–100% formic acid are heated at reflux in an atmosphere of nitrogen for 2 hours. The resulting solution is concentrated to approximately 30 ml. under vacuum at 50° C. and then poured into 200 ml. of a 10% sodium hydroxide solution cooled to 0° C. with ice. The insoluble white solid is filtered with suction, dissolved in 200 ml. of chloroform and dried over anhydrous sodium sulfate. The sodium sulfate is filtered off and the solution concentrated under reduced pressure to a light orange oil. This is converted to a hydrogen maleate salt, M.P. 169.8°–174.8° C. (dec.), by the addition of a solution of maleic acid in ethyl alcohol followed by precipitation of the salt with ethyl ether. Several recrystallizations from ethyl acetate or from an ethyl alcohol-ethyl ether solvent mixture raises the M.P. to 180.3°–182.8° C. (dec.). However the M.P. is still not constant as further recrystallizations raise it even higher.

The maleate preparation with a M.P. of 180.3°–182.8° C. (dec.) is converted to the free base by stirring with 100 ml. of a 10% sodium hydroxide solution at 5–10° C. followed by ether extraction. After the ethyl ether extract has been dried with anhydrous sodium sulfate, filtered, and concentrated under reduced pressure, the resulting white solid, 5.15 g. (45.0%), M.P. 120.0°–122.0° C. is recrystallized from hexane to give an analytical sample, M.P. 120.5°–122.3° C.

$\lambda_{maximum}^{Ethanol}$ 231 m$\mu$, $\epsilon$ 26,531;

266 m$\mu$, $\epsilon$ 14,582; 310 m$\mu$, $\epsilon$ 2,899;

$\lambda_{minimum}^{Ethanol}$ 218–19 m$\mu$, 256 m$\mu$, 295–6 m$\mu$

*Analysis.*—Calculated for $C_{19}H_{19}NS$; C, 77.76; H, 6.53; N, 4.77. Found: C, 77.76; H, 6.79; N, 4.56.

EXAMPLE 2.—1-METHYL-4-(2-CHLORO-10-THIAXANTHYLIDENE)-PIPERIDINE

*Step A.—Preparation of 1-methyl-4-piperidylmagnesium chloride*

Magnesium turnings (2.43 g., 0.1 g. atom) are placed in a 500 ml. 3-necked flask that is equipped with a stirrer, condenser and dropping funnel and protected by soda-lime filled drying tubes. An atmosphere of dry nitrogen is maintained in the apparatus throughout the experiment. The magnesium is covered with 20 ml. of dry tetrahydrofuran and a crystal of iodine is added. Ethyl bromide (1.09 g., 0.1 mole) is added and the mixture stirred and warmed if necessary to initiate the formation of ethylmagnesium bromide. When the reaction is complete the solution is heated to refluxing and stirred while a solution of 13.36 g. (0.1 mole) of 1-methyl-4-chloropiperidine in tetrahydrofuran (volume of solution 61 ml.) is added dropwise, heat being applied as required to maintain refluxing. When the addition is complete, stirring is continued and the reaction mixture is maintained at reflux for 1 hour.

*Step B.—Preparation of 1-methyl-4-(2-chloro-10-hydroxy-10-thiaxanthyl)-piperidine*

The solution of the Grignard reagent obtained in Step A is cooled to 5–10° C. and stirred at this temperature while 2-chlorothiaxanthone (17.3 g., 0.07 mole) is added in portions. The cooling bath then is removed and the mixture stirred for 1 hour at room temperature. The bulk of the solvent then is distilled at 40–50° C. under reduced pressure and 150 ml. of benzene added to the residue. The mixture is stirred and cooled in an ice-bath while 50 ml. of water is added dropwise with stirring to hydrolyze the Grignard adduct. The benzene layer is decanted and the residue extracted with three successive 75 ml. portions of boiling benzene. The benzene extracts are combined, the solvent distilled and the residue dried on the steam-bath under reduced pressure. The oily yellow solid weighs 24.2 g. It is recrystallized from isopropyl alcohol to give 9.4 g. of product, M.P. 221.8–222.8° C., unchanged by further recrystallization.

*Analysis.*—Calculated for $C_{19}H_2OClNOS$: C, 65.97; H, 5.83; N, 4.05; Cl, 10.25. Found: C, 66.01; H, 5.84; N, 4.00; Cl, 10.13.

*Step C.—Preparation of 1-methyl-4-(2-chloro-10-thiaxanthylidene)-piperidine hydrogen maleate*

1-methyl-4-(2-chloro-10-hydroxy-10-thiaxanthyl)-piperidine (4.0 g., 0.0116 mole) is dissolved in 52 ml. of formic acid (98–100%). The solution is heated to refluxing for 2½ hours. The excess formic acid then is distilled under reduced pressure, the residue dissolved in water and the solution rendered alkaline with sodium hydroxide, precipitating the base. The mixture is extracted with benzene, the combined extracts washed with water and the solvent distilled, giving 3.8 g. of the amorphous base. The base is converted to the hydrogen maleate by dissolving it in absolute ether and adding the solution to a 10% molar excess of maleic acid in absolute alcohol. After further diluting with absolute ether, the hydrogen maleate of the product is obtained as a crystalline solid, M.P. 189.1–190.1° C., in a yield of 4.46 g. One recrystallization from absolute alcohol raises the M.P. to 193.1–194.1° C., unchanged after a subsequent recrystallization.

*Analysis.*—Calculated for $C_{19}H_{18}ClNS \cdot C_4H_4O_4$: C, 62.22; H, 4.99; N, 3.16. Found: C, 61.92; H, 5.22; N, 3.11.

EXAMPLE 3

By following the procedures described in Example 2, but replacing, in Step B, the 2-chlorothiaxanthone by an equimolecular quantity of one of the following thiaxanthones:

2-methylthiaxanthone
2-isopropylthiaxanthone
2-trifluoromethylthiaxanthone
2-methoxythianxanthone
2-isopropoxythiaxanthone
2-fluorothiaxanthone
3-chlorothiaxanthone
4-chlorothiaxanthone
2,8-dichlorothiaxanthone
2-bromothiaxanthone
1-chloro-4-methylthiaxanthone and then following substantially the same procedures described in Example 2, there is obtained, respectively:

1-methyl-4-(2-methyl-10-thiaxanthylidene)-piperdine
1-methyl-4-(2-isopropyl-10-thiaxanthylidene)-piperidine
1-methyl-4-(2-trifluoromethyl-10-thiaxanthylidene)-piperidine
1-methyl-4-(2-methoxy-10-thiaxanthylidene)-piperidine
1-methyl-4-(2-isopropoxy-10-thiaxanthylidene)-piperidine
1-methyl-4-(2-fluoro-10-thiaxanthylidene)-piperdidine
1-methyl-4-(3-chloro-10-thiaxanthylidene)-piperidine
1-methyl-4-(4-chloro-10-thiaxanthylidene)-piperidine
1-methyl-4-(2,8-dichloro-10-thiaxanthylidene)-piperidine
1-methyl-4-(2-bromo-10-thiaxanthylidene)-piperidine
1-methyl-4-(1-chloro-4-methyl-10-thiaxanthylidene)-piperidine

EXAMPLE 4

By following the procedures described in Example 2, but replacing, in Step A, the 1-methyl-4-chloropiperidine by an equimolecular quantity of 1-allyl-4-chloropiperidine
1-propyl-4-chloropiperidine and then following substantially the same procedures described in Example 2, there is obtained, respectively:

1-allyl-4-(10-thiaxanthylidene)-piperidine
1-propyl-4-(10-thiaxanthylidene)-piperidine.

What is claimed is:
1. A compound of the formula

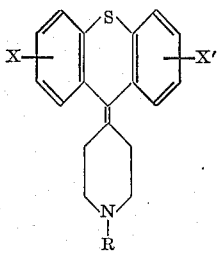

wherein X and X' can be the same or different and are selected from the group consisting of hydrogen, halogen, lower-alkyl, perfluoro lower-alkyl, lower-alkoxy and phenyl, and R is selected from the group consisting of lower-alkyl and lower-alkenyl; and the non-toxic salts of said compound.

2. A compound of the formula

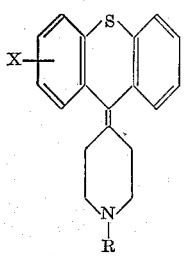

wherein X is selected from the group consisting of hydrogen, halogen, lower-alkyl, perfluoro lower-alkyl, lower-alkoxy and phenyl, and R is selected from the group consisting of lower-alkyl and lower-alkenyl; and the non-toxic salts of said compound.

3. The compound of claim 2 wherein X is halo.

4. A compound of the formula

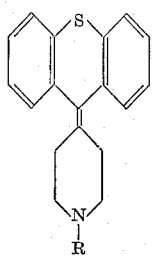

wherein R is lower-alkyl, and the non-toxic salts of said compound.

5. 1-methyl-4-(10-thiaxanthylidene)piperidine and the non-toxic salts of said compound.

6. 1 - methyl-4-(2-chloro-10-thiaxanthylidene) - piperidine and the non-toxic salts of said compound.

References Cited by the Examiner
UNITED STATES PATENTS

| | | | |
|---|---|---|---|
| 2,940,969 | 6/1960 | Bonvicino et al. | 260—328 |
| 2,951,082 | 6/1960 | Sprague et al. | 260—328 |
| 2,996,503 | 8/1961 | Sprague et al. | 260—328 |
| 3,014,911 | 12/1961 | Engelhardt | 260—293.44 |
| 3,055,903 | 9/1962 | Renz et al. | 260—293.44 |
| 3,073,847 | 1/1963 | Doebel et al. | 260—293.44 |
| 3,116,291 | 12/1963 | Petersen et al. | 260—328 |

FOREIGN PATENTS 829,763  4/1960  Great Britain.

OTHER REFERENCES

Theilheimer, Synthetic Methods of Organic Chemistry, volume 1, page 214 (1948).
Theilheimer, Synthetic Methods of Organic Chemistry, valume 2, page 262 (1949).

WALTER A. MODANCE, *Primary Examiner.*
IRVING MARCUS, *Examiner.*
JOSEPH W. MOLASKY, ROBERT L. PRICE, AVROM D. SPEVACK, *Assistant Examiners.*